3,535,076
PRODUCTION OF CYANOGEN
Rudolf Fahnenstich, Gross Auheim, and Hermann Schulz, Frankfurt am Main, Germany, assignors to Deutsche Gold- und Silber - Scheideanstalt vormals Roessler, Frankfurt am Main, Germany
No Drawing. Filed Feb. 26, 1968, Ser. No. 707,978
Claims priority, application Germany, Mar. 21, 1967, D 52,592
Int. Cl. C01c 3/00; C01g 1/06; C01f 15/00
U.S. Cl. 23—151                                  10 Claims

ABSTRACT OF THE DISCLOSURE

Cyanogen is produced by reacting cyanogen chloride in the gas phase with metallic elements in which enthalpy of formation of the chlorides of the elements is more than 97 and preferably more than 105 kcal. mol$^{-1}$, such as aluminum or titanium, or with alloys containing such elements as the main constituent.

BACKGROUND OF THE INVENTION

The invention relates to an improved process for the production of cyanogen.

Cyanogen has recently been taken into consideration as a rocket fuel in view of its high heat of combustion. In addition, cyanogen flames have been used for welding and cutting metals and used in flame photometers for exciting elements. It has also been proposed that cyanogen be used as a fumigant for the destruction of insects. These proposals, however, have not previously led to practical widespread use of cyanogen. The reason for this is the lack of a process for its production which can be carried out economically on a large scale and also the difficulties in handling the substance because of its special physical properties and its poisonous nature.

Cyanogen is also of interest in view of its many reaction possibilities which can lead to a number of valuable compounds, such as, for example, oxamide which is useful as a fertilized, especially for lawn culture, and ethylene diamine which is known as a starting material for the production of a number of valuable pesticides, chelating agents, detergents and textile assistants.

One prerequisite for the use of cyanogen on a large scale is an economical process for its production. The known methods for the production of cyanogen from mercury, copper or silver cyanide are not satisfactory in this respect. Also, the many attempts to oxidize hydrocyanic acid with air or nitrogen dioxide (see British Pat. 932,520) have not led to complete success. Aside from the fact that the yields in some instances are inadequate, this process always involves a rather costly separation of the cyanogen produced from permanent residual gases.

SUMMARY OF THE INVENTION

According to the invention it was found that cyanogen can be produced in almost quantitative yield in a simple manner by reacting cyanogen chloride in the gas phase with metallic elements in which the enthalpy of formation of the chlorides is more that 97 kcal. mol$^{-1}$ or their alloys which contain such elements as main constituent. With some elements the enthalpy of formation of the chlorides is over 105 kcal. mol$^{-1}$.

DETAILED DESCRIPTION OF THE INVENTION INCLUDING PREFERRED EMBODIMENTS

Among others, the alkali metals, the alkaline earth metals, magnesium, zinc, aluminum, silicon, titanium, zirconium, thorium, vanadium, chromium, tungsten and maganese come into consideration as suitable metallic elements for the reaction according to the invention with cyanogen chloride.

As in the reaction of cyanogen chloride with the metallic elements according to the invention mostly easily condensable chlorides of the metallic elements concerned are produced, it is possible to select among the metallic elements which are suitable those which may serve to produce technically interesting chloride byproducts as these are produced practically quantitatively in a very pure form. For instance, the reaction of cyanogen chloride with silicon or starting materials essentially containing silicon is very advantageous in this respect as the silicon tetrachloride which is simultaneously produced can be used advantageously in the production of pyrogenic silica. It similarly is advantageous when aluminum or titanium is used for reaction with the cyanogen chloride.

In addition to the pure metals, it is also possible to use their alloys or mixtures with each other or such alloys which contain such metals as main components that is between 50 and 99%. The term metal is used herein to include silicon. Examples of such alloys, for instance, are ferrosilicon, Silumin, Electron, Duralumin, the iron alloys of chromium, manganese, titanium, vanadium and tungsten, zinc alloys with aluminum or manganese, aluminum alloys with manganese or zinc, magnesium alloys with zinc, manganese or aluminum and the like.

The temperature of the reaction should be 300° C. and over, advantageously the reaction is carried out within the range of 500 to 1000° C. As the reaction of cyanogen chloride with the metallic elements employed according to the invention is exothermic, it is generally not necessary to supply further heat from an external source once the reaction has been initiated when sufficient insulation is provided. A special advantage of the process according to the invention is that the course of the reaction is not sensitive to the temperature employed. This substantially simplifies the large scale technical application of the process as the reaction can be controlled over a wide range of temperatures without the danger of suffering a loss in yield or of the occurrence of undesired byproducts.

As already indicated, a special advantage of the process according to the invention can be seen in that not only the cyanogen component but also the chlorine component of the reacting cyanogen chloride can be practically quantitatively utilized in the production of valuable intermediate products. A further advantage of the process according to the invention, for example, as contrasted to the process for the production of cyanogen by the oxidation of hydrocyanic acid, is that the processing of the dicyanogen produced is not rendered difficult by the presence of foreign gases. The separation of the cyanogen produced can be effected in a simple manner by fractional distillation as in all instances there is a sufficient difference in the boiling points of the cyanogen chloride, which may not have reacted, the chlorides produced and the cyanogen. Therefore, extraction methods with the use of assistants which are technically costly to carry out are avoided with the process according to the invention.

The process according to the invention is illustrated by the following representative examples. At the temperatures indicated a reaction period of 3 to 5 seconds suffices to render the conversion of the cyanogen chloride quantitative. Naturally the conversion is dependent upon the temperature and reaction period employed.

Example 1

91 g. of cyanogen chloride were passed at 810° C. through a quartz reaction tube of a 20 mm. interior diameter filled with silicon of a grain size of 0.5–5 mm., the velocity of the cyanogen chloride stream was such that its period of stay within the reaction space was 0.9 second. The reaction gases leaving the quartz tube were condensed in cold traps cooled to −70° C. Upon rectification of the product thus obtained 24 g. of cyanogen chloride were recovered (conversion of cyanogen chloride supplied 67 g. or 73.7%), 28 g. of cyanogen (yield on cyanogen chloride converted 99%) and 45.8 g. of silicon tetrachloride (yield 99%). The loss in weight of the silicon was 7.3 g. (95.5% of theory).

Example 2

The procedure of Example 1 was repeated except that the velocity of the cyanogen chloride stream was such that its period of stay in the reaction space was increased to 4.5 seconds. Upon rectification of the reaction product 38 g. of cyanogen (98.5% of theory) and 61 g. of silicon tetrachloride (97% of theory) were obtained. The conversion of the cyanogen chloride was complete. The loss in weight of the silicon was 10.2 g. (98.5% of theory).

Example 3

A quartz reaction tube of a 20 mm. interior diameter was filled with granular ferrosilicon with an iron content of 8% and heated to 760° C. 84 g. of cyanogen chloride were then passed through the tube at such a velocity that the period of stay in the reaction space was 4 seconds. Upon rectification of the reaction product, 35 g. of cyanogen (98.5% of theory) and 51 g. of silicon tetrachloride (88% of theory) were obtained. In addition, iron chloride was produced which deposited on the ferrosilicon and in part sublimed into the cold traps. When the ferrosilicon was used a second time the yield of silicon tetrachloride also rose to 98% of theory and the formation of iron chloride was no longer observed.

Example 4

A quartz tube as used in Example 1 was filled with coarse aluminum turnings instead of silicon and 50 g. of cyanogen chloride were passed therethrough at a temperature of 500° C. at such a velocity that its period of stay in the reaction space was 3.3 seconds. The reaction products were first passed through a flask and then through a column filled with Raschig rings in order to separate off the aluminum chloride produced and then condensed in cold traps at −70° C. 35 g. of aluminum chloride (96.7% of theory) and 20 g. of cyanogen (95% of theory) were obtained.

Example 5

68 g. of cyanogen chloride were passed over metallic titanium in a reaction tube at 800° C. at such a velocity that its period of stay was 3.0 seconds. The gases leaving the reaction tube were condensed and rectified.

28 g. of cyanogen (97.3% of theory), 50.5 g. of titanium tetrachloride (96.3% of theory) and in addition 2 g. of titanium trichloride were obtained.

It will be observed that the conversion of cyanogen chloride in the examples ranges from a low of 73.7% in Example 1 and that a time as short as 0.9 second was used.

We claim:

1. A process for production of cyanogen which comprises reacting cyanogen chloride in the gas phase with a metallic substance, the chloride of which has an enthalpy of formation which is over 97 kcal. mol$^{-1}$ or alloys in which such elements are the main constitutent at a temperature over 300° C.

2. The process of claim 1 in which the enthalpy of formation of the chlorides is over 105 kcal. mol$^{-1}$.

3. The process of claim 1 in which the metallic substance is selected from the group consisting of silicon, aluminum, titanium and their alloys.

4. The process of claim 1 in which the reaction temperature is betwen 500 and 1000° C.

5. A process according to claim 1 wherein the temperature is between 300° C. and 1,000° C. and the cyanogen is recovered.

6. A process according to claim 5 wherein the metallic substance is selected from the group consisting of alkali metals, alkaline earth metals, magnesium, zinc, aluminum, silicon, titanium, zirconium, thorium, vanadium, chromium, tungsten and manganese and their alloys.

7. A process according to claim 6 wherein the reaction is carried out until at least 73.7% of the cyanogen chloride has reacted.

8. A process according to claim 6 wherein the reaction is carried out by contact for at least 0.9 second.

9. A process according to claim 8 including the step of fractionally distilling the product to separate the cyanogen from the metal chloride formed.

10. A process according to claim 9 wherein the metallic substance is selected from the group consisting of silicon. aluminum, titanium and their alloys and the reaction time is 0.9 to 5 seconds.

References Cited

FOREIGN PATENTS 525,871  6/1956  Canada.
1,079,611  4/1960  Germany.

OSCAR R. VERTIZ, Primary Examiner

H. S. MILLER, Assistant Examiner

U.S. Cl. X.R.

23—87, 89, 90, 92, 97, 345